F. I. Norton.
Horse Power.
No 5,530.  Patented Apr. 25, 1848.
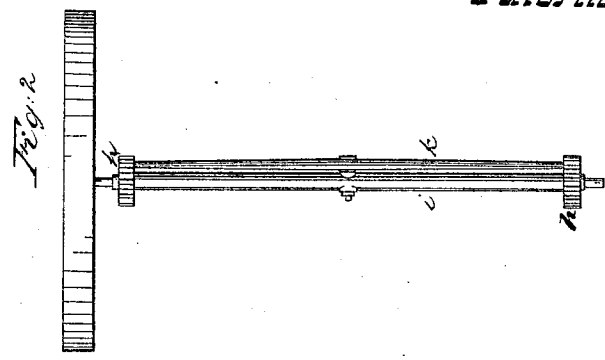
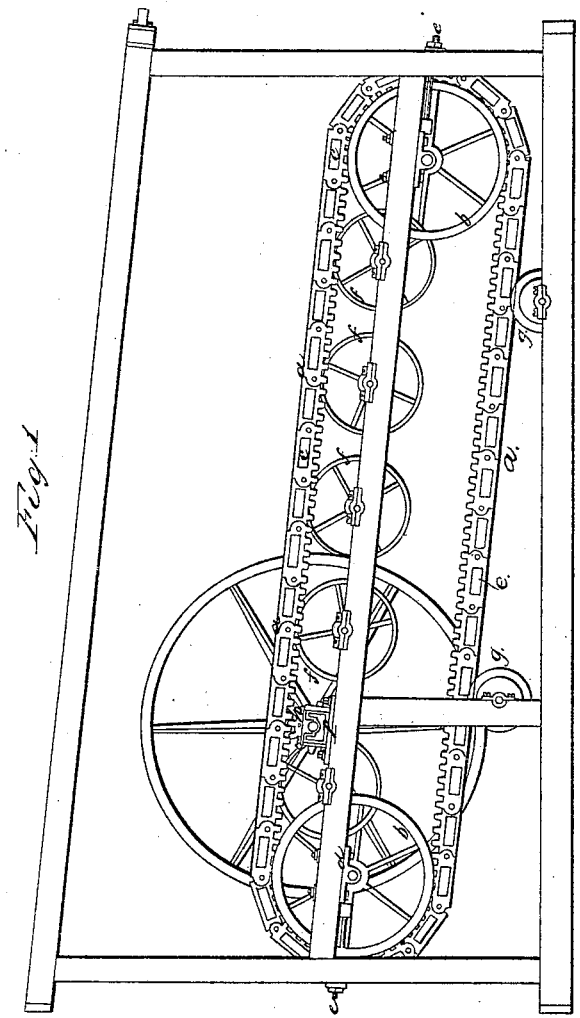

UNITED STATES PATENT OFFICE.

FAULKNER I. NORTON, OF LOWER SANDUSKY, OHIO.

HORSE-POWER.

Specification of Letters Patent No. 5,530, dated April 25, 1848.

*To all whom it may concern:*

Be it known that I, FAULKNER I. NORTON, of Lower Sandusky, in the county of Sandusky and State of Ohio, have invented a new and valuable Improvement in Endless-Chain Racks and Inclined-Rotating-Platform Horse-Powers; and I do hereby declare the following to be a full, clear, and exact description thereof, reference being had to the accompanying drawings, making a part of this specification, in which—

Figure 1, is a side elevation of my improved horse power, and Fig. 2, is a plan of the main shaft thereof detached, showing the manner of connecting the pinions on each end of the same to each other and to the shaft.

Similar letters indicate like parts in both figures.

The nature of my improvement consists in the connecting the pinions on each end of the main shaft, to each other and to the shaft, in such a manner as to render them perfectly self adjusting, and enabling them to compensate for any inequality of tension, and imperfection of the endless chain racks, by which they are driven; so that the power exerted upon each shall be always equal and uniform.

The endless chain racks are composed of the links $a$, $a$, having cogs on one edge and are united to each other by rule joints. The links have mortises cast in them for the reception of the ends of the section $c$, $c$, forming the endless inclined floor, or platform. The endless chain racks pass over and are sustained by the tension wheels $b$, $b$, which have flanges projecting from their peripheries for guiding the same. The tension wheels $b$, $b$, have their bearings in the adjustable boxes $d$, $d$, which are operated, and the requisite tension given to the racks by the screws $e$, $e$.

$f$, $f$, are sustaining rollers placed under the endless chain racks, between the tension wheels $b$, $b$, for sustaining and preventing from sagging the inclined floor on which the animal travels for operating the machine.

$g$, $g$, are rollers placed under the lower, or returning portion of the endless racks, for supporting the same, and preventing them from sagging.

The main shaft $i$, has its bearings in the boxes P; the pinions $h$, $h$, are secured to each other and to the main shaft $i$, by means of the bar $k$, as represented in Fig. 2. The bar $k$, is jointed at its center to the central portion of the main shaft, and its ends are connected to the pinions $h$, $h$, in such a manner as to give them a free reciprocating action with each other on the shaft, for the purpose as herein set forth.

The advantages of this method of connecting the pinions to the main shaft, are so great, and so apparent, that it is not necessary to point them out. They will at once be appreciated by any one familiar with machinery.

Having thus fully set forth the nature of my improvement in horse powers, what I claim as my invention and desire to secure by Letters Patent, is—

The combination of the pinions $h$, $h$, with each other and with the main shaft, by means of the bar $k$, substantially in the manner and for the purpose herein set forth.

F. I. NORTON.

Witnesses:
Z. C. ROBBINS,
GUY C. HUMPHRIES.